United States Patent Office 3,006,778
Patented Oct. 31, 1961

3,006,778
WAXY COMPOSITION SUITABLE AS AN IMPREGNATING AGENT, A PROCESS FOR ITS PRODUCTION, AND IMPREGNATION OF POROUS, ESPECIALLY CELLULOSIC MATERIALS OR OBJECTS WITH THE AID OF THIS COMPOSITION
Eric Johansson, Lovbrunna Gard, Taby, Sweden
No Drawing. Filed Mar. 4, 1957, Ser. No. 643,532
Claims priority, application Sweden Mar. 8, 1956
12 Claims. (Cl. 106—123)

The present invention is concerned with an impregnating agent prepared from tall oil and bestowing hydrophobic properties on the impregnated materials or objects, and furthermore covers the use and the preparation of this impregnating agent. The agent is particularly useful for the impregnation of cellulosic products such as fiber suspensions and fiberboard plates.

As is well known, cellulosic products have a tendency to absorb water, which is very disturbing for many of the purposes for which the products may be intended. For instance, it is particularly disturbing in fiberboard plates, as such water absorption may give rise to considerable changes in the dimensions of the plates. When the plates are joined together or nailed in building constructions etc. such subsequent changes in the length and width dimensions may cause bulging, while changes in the thickness of the plates (swelling due to water absorption) often will involve formation of cracks along the joints, or drawing out of the nails employed for attaching the plates.

These disadvantages are so great that already many attempts have been made to give the fiberboard plates a treatment to reduce their tendency towards deformation. For this purpose, the plates have been impregnated prior to, during, or after their manufacture with such hydrophobing agents as drying oils, oil mixtures with natural or synthetic resins, tall fatty acids and the like, but without fully satisfactory results. The impregnating agent which is mostly employed at present is linseed oil either alone or in admixture with gasoline. Such mixtures however, are comparatively expensive and moreover do not make the plates permanently hydrophobic; the cellulosic material which has been treated in this manner will gradually acquire an increased affinity for water as the linseed oil is oxidized.

Attempts have also been made, for reasons of economy, to use tall acid (a mixture containing fatty acids and rosin acids as its main ingredients) for such hydrophobing purposes, such tall acids having been employed either alone, or in admixture with other hydrophobing agents, or in the form of esterification products with polyhydric alcohols such as glycerol, pentaerythritol and the like; also tall acid esters with lower monohydric alcohols (e.g. butanol) have been employed for this purpose. However, all these earlier attempts have failed to give fully satisfactory results in technical and economical respects.

After all these generally rather unsatisfactory attempts I have now found, very unexpectedly, that esters of tall acids which consist essentially of a mixture of higher fatty acids and rosin acids—e.g. comprising about 70 to 90% fatty acids and about 3 to 23% rosin acids, the remainder being unsaponifiable matter—may be utilized, and with excellent results, for the impregnation of wood fiber plates as well as of other porous products. The impregnating agent according to my invention is a waxy composition (if desired dissolved or emulsified in a suitable medium) containing esters of tall acids with one or more high molecular monohydric alcohols having from 12 to 36 carbon atoms, and preferably containing also an excess of free acids. Such an excess of acids is desirable for economical reasons (complete esterification of the alcohol), and especially also for technical reasons, as the free acids due to their capacity of forming soaps will facilitate emulsification.

Particularly good results have been obtained with waxy compositions which in addition to the aforesaid esters and acids contain zinc and/or tin salts, especially if the compositions are to be used for impregnating cellulosic products. The presence of such salts has unexpectedly been found to bestow upon the cellulosic material an increased capacity of absorbing the waxy composition. This phenomenon is probably due to the fact that the zinc and tin salts are present in the mixture in the form of soaps, and these soaps will then easily attach themselves to the hydroxyl groups of the cellulosic material whereby this material, which is naturally more hydrophilic than lipophilic, will become more lipophilic and thus will bind the waxy ester composition more easily. If said composition is applied in the form of a solution or emulsion the presence of said metal salts will also make the cellulosic material more easily wettable with unpolar substances. However, the mechanism of these processes has not yet been fully investigated and the present invention is not limited to any theory.

The alcohol component of the ester mixture may consist of one or more of such alcohols as may be obtained, according to ordinary methods, by reduction of tall fatty acid or acids, such as for instance cetyl and/or stearyl alcohol. This involves the additional advantage that also this component may be obtained from the same starting material, i.e. tall fatty acids which as a rule are readily available as cheap raw products. Of course, it is possible to use other alcohols such as for instance lauryl, myristyl and similar alcohols.

The impregnating composition according to the invention is produced in the following manner; tall acids, e.g. in the form of commercial tall oil products, for instance distilled tall oil, A oil (which latter is particularly rich in palmitic acid) etc., are at elevated temperatures and in the presence of a catalyst esterified with one or more higher molecular monohydric alcohols having from 12 to 36 carbon atoms, said alcohols being preferably employed in a stoichiometrically insufficient amount to bind all the free acids in the tall oil. The esterification is carried on so far as to give a wax-like product. This being an equilibrium reaction, the temperature employed should be sufficiently high to cause the water formed during the esterification to evaporate. The esterification will proceed most rapidly if carried out at relatively high temperatures, e.g. over 200° C. For instance, the reaction mixture may at the beginning of the process be heated directly (within 0.5 to 2 hours) to about 280° C., then maintained at this temperature for a suitable period, usually of from 0.5 to 6 hours and preferably from 1 to 3 hours, and then, towards the end of the reaction, the temperature may be raised still further for a sort period, e.g. 5 minutes to half an hour, for instance to about 310–350° C. and preferably to about 320° C., this being done in order to ensure a complete esterification of the alcohol component which is relatively expensive as compared with the tall acids and which for this as well as for other reasons cited above is preferably employed in an amount insufficient to bind all the acids.

The catalysts used in the process may be mineral acids (e.g. sulfuric or hydrochloric acid) which at least in some cases and especially in the case of hydrochloric acid will during the esterification process escape together with the evaporated water. However, still better final products will be obtained if zinc and/or tin salts (preferably halides) are used in the process instead of mineral acids. These zinc and tin salts are also good esterification catalysts and moreover will provide for a further important advantage; for instance, when zinc chloride or tin (II) chloride is used in the esterification process, the chlorine appears to escape in the form of hydrochloric acid together with the evaporating water whereas the metal ion remains in the composition produced, in the form of one or more salts, probably soaps. The final product thus obtained is the preferred impregnating composition having the aforesaid advantageous properties. The zinc or tin halides or their mixtures may suitably be used in an amount of 1–6 and preferably 2–4% by weight, based on the weight of the total starting mixture.

It is particularly convenient to use cetyl and/or stearyl alcohol in this process, as these alcohols have the aforesaid advantage that they may be obtained from another portion of the cheap tall fatty acids employed for preparing the waxy composition. In order to produce those alcohols the palmitic and/or stearic acid components of the tall acid are subjected to reduction in a known per se manner. I may also use other monohydric alcohols, having 12–36 carbon atoms and, in some cases, for this purpose produce them from tall fatty acids.

The impregnating composition according to my invention may be prepared for instance in the following way:

The starting material, tall acid, may contain for instance,

| | Percent |
|---|---|
| Fatty acids | 68–91 |
| Rosin acids | 3–23 |
| Unsaponifiable matter | 6–9 | particularly suitable are tall acids containing:

| | Percent |
|---|---|
| Fatty acids | 80–85 |
| Rosin acids | 8–10 |
| Unsaponifiable matter | 8–9 |

The starting material is esterized to the desired acid number with the aid of cetyl or stearyl alcohol or of a mixture of these alcohols, in the presence of from 1 to 5% of $ZnCl_2$ or $SnCl_2$, the alcohol being employed in an amount insufficient to bind all the acids. The reaction components are heated at about 280° C. for one hour whereupon the temperature is for 5 to 10 minutes raised to about 320° C., to ensure complete esterification of the alcohol component. The reaction product thus obtained will have about the following characteristics:

| | |
|---|---|
| Spec. gravity | 0.950 |
| Acid number | 10 |
| Saponification number (according to Wolf) | 90 |
| Ash percent | 2 |
| Viscosity, cp. at 50° C | 430 |
| Softening temperature (determined according to the ball and ring method), ° C | 24 |

The product has a brownish color and a weakly aromatic smell.

Typical mixtures from which the impregnating agent according to my invention may be produced are for instance the following:

55–85 parts of tall oil, 15–42 parts of cetyl alcohol and 2–3 parts of zinc chloride, or 52–80 parts of tall oil, 18–43 parts of stearyl alcohol and 2–5 parts of tin chloride.

Some suitable starting mixtures are more specifically described in the below examples.

EXAMPLE I

| | G. |
|---|---|
| Tall acid (85% fatty acids) | 150 |
| Cetyl alcohol | 110 |
| $ZnCl_2$ | 3.5 |

The mixture may suitably be heated to 280–320° C. to produce an esterification product having the acid number 10.

EXAMPLE 2

| | G. |
|---|---|
| Tall acid (91% fatty acids) | 128 |
| Stearyl/cetyl alcohol, 50:50 | 122 |
| $SiCl_2$ | 4 |

The mixture may suitably be heated to 280–320° C. to produce an esterification product having the acid number 8.

EXAMPLE 3

| | G. |
|---|---|
| Tall acid (70% fatty acids) | 510 |
| Cetyl alcohol | 90 |
| $ZnCl_2$ | 18 |

The mixture may suitably be heated to 280–320° C. to produce an esterification product having the acid number 60.

As will be seen already from the foregoing illustrative examples, the acid number may be varied within a wide range, namely for instance within the range of from 0 to 100 but preferably within the range of from 10–60— according to the purpose for which the impregnating composition is to be used.

To impregnate porous products, the waxy composition may be used either as such, or in the form of a solution in organic solvents (e.g. in white spirit having a boiling point ranging from 110 to 210° C. or from 140 to 210° C., if desired in admixture with methylene chloride, or in benzene, toluene etc.), or in the form of an aqueous emulsion, of the water-in-oil or oil-in-water type, of either the waxy composition itself or said solution of the composition in an organic solvent. Suitable solutions and emulsions may be prepared in for instance any of the following ways:

EXAMPLE 4

A waxy composition produced according to any of Examples 1–3 is melted and dissolved in an organic solvent such as e.g. white spirit distilling at 140–210° C., the proportions chosen being such that the resultant solution will contain from 10 to 90 and preferably from 40 to 60 percent solids. Alternatively, the solvent may be composed of methylene chloride (10–15% by volume) and white spirit (90–85% by volume).

EXAMPLE 5

A waxy composition according to the invention is dissolved in 40–60% white spirit whereupon the solution is emulsified in hot water in the presence of about 0.6% of an about 25% ammonia solution. To prepare this emulsion it is particularly advantageous to employ a waxy composition prepared according to Example 3, as the high excess of acid therein will promote emulsification. Upon evaporation of the ammonia the waxy composition when employed for impregnation will be irreversibly precipitated in the impregnated product.

EXAMPLE 6

An emulsion of the water-in-oil type is prepared in the following way: 60 parts by weight of waxy composition are melted, 2½ parts by weight of a fatty acid tin salt (e.g., tin oleate) are dissolved therein, and then the mass is thorougly admixed with 40 parts by weight of hot water.

EXAMPLE 7

An emulsion of the oil-in-water type is prepared by melting 70 parts by weight of waxy composition and emulsifying the molten mass in a boiling solution of 5 parts of naphthenic acid, 5 parts of 25% ammonia and 60 parts of water. In this case again the subsequent evaporation of the ammonia will give the product the same desirable properties as described in Example 5.

Fiber products, especially wood fiber products, may be impregnated for instance in any of the following ways:

EXAMPLE 8

A fiber suspension which is subsequently to be shaped and pressed into plates is admixed with about 0.1 to 2% and preferably 0.5 to 1% of wax in the form of an emulsion according to Example 5 (calculated as the weight of the dry fibers). The plates are then manufactured in the ordinary manner.

EXAMPLE 9

A wet-shaped fiber product, e.g., a sheet or plate, which is to be heat-pressed in order to obtain the final product is sprayed with 1–10 and preferably 2–5% of wax in the form of a wax emulsion according to Example 5 (calculated on the dry fiber weight), while advancing on the conveyor belt of the wallboard machine.

EXAMPLE 10

A fiberboard plate is impregnated by being dipped for 8–16 seconds into a warm wax solution according to Example 4 containing 40–60% solids, the temperature of said solution being between about 50 and 85° C., preferably about 75° C. The plate will absorb about 5–15% by weight of wax solution, calculated on the weight of the final plate. The wax adhering to the plate surfaces after this treatment is scraped off.

The impregnation has here been illustrated with fiber products. Such products are mostly manufactured from wood fibers but may also be made of other vegetable fibers such as straw, bagasse, bamboo or bark fibers, and any such fiber products may also be impregnated successfully in accordance with my invention. Moreover, the waxy compositions according to my invention are useful impregnating agents for other porous materials. In addition to wood fiber products and objects, the materials for which the agent is useful in the first place are, i.a., other cellulosic products such as wood, paper, paperboard, cardboard, pasteboard, etc., but very good results are obtained also when other porous products are impregnated such as for instance textiles, hides, leather, etc. The waxy compositions according to the invention may if desired be used together or in admixture with other waxes, fats or oils, e.g. linseed oil and ceresine.

When impregnated with a composition according to my invention the products will have a permanently hydrophobic character, that is, they will be characterized by a very considerably reduced tendency to take up water. This quality is of very great importance especially for wood fiber boards, as it implies an efficient counter-action of changes in the dimensions of the boards, e.g. swelling, with the draw-backs involved therewith.

The superior results obtained with the impregnating agent according to my invention are illustrated in the tables below in which fiberboard plates impregnated with my agent are compared with both untreated plates and plates treated with such agents that have been in use heretofore.

TABLE 1

*Hard wallboard plates (fir and pine fibers 50:50)*

|  | Untreated | | Sized with 0.2% Wax Acc. to Invention | | Impregnated with 3.2% Wax Acc. to Invention | |
| --- | --- | --- | --- | --- | --- | --- |
|  | hard plates | heat-hardened for 3 hours at 160° C. | hard plates | heat-hardened for 3 hours at 160° C. | hard plates | heat-hardened for 3 hours at 160° C. |
| Weight, kg./sq. cm. | 3.89 | 3.82 | 3.67 | 3.78 | 3.69 | 3.68 |
| Flexural Strength, kg./sq. cm. | 400 | 505 | 440 | 505 | 455 | 551 |
| Tensile Strength, kg./sq. cm. | 282 | 320 | 344 | 355 | 340 | 360 |
| Water Absorption in 24 hours, Percent | 67.0 | 29.6 | 26.0 | 15.3 | 12.0 | 5.8 |
| Swelling in Thickness in 24 hours, Percent | 40.3 | 20.0 | 13.5 | 10.8 | 8.3 | 5.0 |

TABLE 2

*Fiberboard plates of identical material impregnated with equal amounts (percent by weight) of impregnating agent*

| Water Absorption, Percent | Tall Fatty Acid | Tall Acid Esters with Polyhydric Alcohols | Tall Acid Esters Acc. to Invention |
| --- | --- | --- | --- |
| After half an hour | 20.6 | 2.3 | 1.4 |
| After 2 hours | 33.2 | 5.0 | 2.2 |
| After 6 hours | 38.4 | 9.4 | 3.6 |
| After 24 hours | 41.8 | 23.8 | 7.5 |
| Swelling in Thickness after 24 Hours, Percent | 21.4 | 19.2 | 5.3 |

I claim:

1. A waxy composition having water-repellent properties when used as impregnating agent for cellulosic materials, said composition comprising a mixture of esters of tall oil acids containing from 3–23 percent of rosin acids, from 6–9 percent of unsaponifiable matter and from 68–91 percent of fatty acids, with at least one high molecular monohydric, aliphatic alcohol having from 12 to 36 carbon atoms, the said mixture of esters having an acid number within the range of from 0 to 100.

2. A waxy composition having water-repellent properties when used as impregnating agent for cellulosic materials, said composition comprising a mixture of esters of tall oil acids containing from 3–23 percent of rosin acids, from 6–9 percent of unsaponifiable matter and from 68 to 91 percent of fatty acids, with at least one high molecular monohydric, aliphatic alcohol having from 12 to 36 carbon atoms, the said mixture of esters having an acid number within the range of from 0 to 100, and said composition further comprising at least one salt selected from the group consisting of salts of zinc and tin with mineral acids.

3. A waxy composition according to claim 2, in which the salt present is selected from the group consisting of zinc and tin halides.

4. A waxy composition according to claim 2, in which the salt present is selected from the group consisting of zinc and tin dichloride.

5. A waxy composition having water-repellent properties when used as impregnating agent for cellulosic materials, said composition comprising a mixture of esters of tall oil acids containing from 8–10 percent of rosin acids, from 8–9 percent of unsaponifiable matter and from 80–85 percent of fatty acids, with at least one alcohol selected from the group consisting of cetyl and stearyl alcohol, said mixture of esters having an acid number within the range of from 0 to 100.

6. A waxy composition having water-repellent properties when used as impregnating agent for cellulosic materials, said composition comprising a mixture of esters of tall oil acids containing from 8–10 percent of rosin acids, from 8–9 percent of unsaponifiable matter and from 80–85 percent fatty acids, with at least one alcohol selected from the group consisting of cetyl and stearyl alcohol, said mixture of esters having an acid number within the range of from 0 to 100, and said composition further comprising at least one salt selected from the group consisting of zinc and tin dichloride.

7. A solution containing a waxy composition dissolved in an organic solvent which comprises a mixture of esters of tall oil acids containing from 3–23 percent of rosin acids, from 6–9 percent of unsaponifiable matter and from 68 to 91 percent of fatty acids, with at least one high molecular monohydric, aliphatic alcohol having from 12 to 36 carbon atoms, the said mixture of esters having an acid number within the range of from 0 to 100.

8. An aqueous emulsion containing a waxy composition which comprises a mixture of esters of tall oil acids containing from 3–23 percent of rosin acids, from 6–9 percent of unsaponifiable matter and from 68 to 91 percent of fatty acids, with at least one high molecular monohydric, aliphatic alcohol having from 12 to 36 carbon atoms, the said mixture of esters having an acid number within the range of from 0 to 100, said waxy composition further comprising at least one salt selected from the group consisting of zinc and tin dichloride.

9. A process for producing a waxy composition having water-repellent properties when used as impregnating agent for cellulosic materials which comprises the steps of esterifying tall oil acids containing from 3–23 percent of rosin acids, from 6–9 percent of unsaponifiable matter and from 68 to 91 percent of fatty acids, at a temperature within the range of from 200° to about 350° C. in the presence of a catalyst selected from the group consisting of salts of tin and zinc with mineral acids, with at least one high molecular monohydric, aliphatic alcohol having from 12 to 36 carbon atoms in such a quantity so as to form a waxy composition having an acid number within the range of from 0 to 100.

10. The process according to claim 9 in which the catalyst is selected from the group consisting of tin and zinc dichlorides.

11. The process according to claim 9, in which the alcohol is selected from the group consisting of alcohols obtained by the hydrogenation of tall oil fatty acids.

12. A process according to claim 9, in which the alcohol is selected from the group consisting of cetyl alcohol and stearyl alcohol.

References Cited in the file of this patent

UNITED STATES PATENTS

| | | |
|---|---|---|
| 1,988,161 | Chaplin | Jan. 15, 1935 |
| 2,215,244 | Linzell | Sept. 17, 1940 |
| 2,293,844 | Maxwell | Aug. 25, 1942 |
| 2,345,142 | Muller | Mar. 28, 1944 |
| 2,407,248 | Borglin | Sept. 10, 1946 |
| 2,568,741 | Kirkpatrick | Sept. 25, 1951 |
| 2,659,718 | Eckhardt | Nov. 17, 1953 |
| 2,679,462 | Monson | May 25, 1954 |
| 2,744,889 | Goyer | May 8, 1956 |
| 2,815,295 | Forsythe | Dec. 3, 1957 |

FOREIGN PATENTS

| | | |
|---|---|---|
| 711,076 | Germany | Aug. 21, 1941 |